United States Patent
Higaki et al.

(10) Patent No.: US 7,221,625 B2
(45) Date of Patent: May 22, 2007

(54) MULTI-CHANNEL ACOUSTIC APPARATUS WITH DVD REPRODUCTION FUNCTION

(75) Inventors: Yoshihiko Higaki, Hirakata (JP); Yutaka Kanazawa, Nishinomiya (JP)

(73) Assignees: Sanyo Electric Co., Ltd., Osaka (JP); Sanyo Technosound Co., Ltd., Osaka (JP)

( * ) Notice: Subject to any disclaimer, the term of this patent is extended or adjusted under 35 U.S.C. 154(b) by 809 days.

(21) Appl. No.: 10/383,640

(22) Filed: Mar. 10, 2003

(65) Prior Publication Data

US 2003/0182002 A1    Sep. 25, 2003

(30) Foreign Application Priority Data

Mar. 25, 2002   (JP)   .............................. 2002-084158
Mar. 25, 2002   (JP)   .............................. 2002-084160

(51) Int. Cl.
  *H04B 1/20*    (2006.01)
  *G11B 5/09*    (2006.01)
  *G11B 3/74*    (2006.01)
  *H04N 5/91*    (2006.01)
  *G10L 19/00*   (2006.01)
  *H04R 5/00*    (2006.01)

(52) U.S. Cl. .......................... 369/2; 369/47.16; 369/86; 386/97; 386/105; 704/500; 381/17; 381/22; 381/20

(58) Field of Classification Search ................. 700/94; 381/17, 22, 20; 704/500; 369/47.16, 186, 369/170, 86–90, 2; 386/97, 105
See application file for complete search history.

(56) References Cited

U.S. PATENT DOCUMENTS 5,257,313 A * 10/1993 Fujishita et al. .............. 381/18

5,748,835 A * 5/1998 Lee ............................ 386/104

(Continued)

FOREIGN PATENT DOCUMENTS

JP    02-131700 A    5/1990

(Continued)

OTHER PUBLICATIONS

Dressler, Roger. Pro Logic Surround Decoder Principles of Operation. Dolby Labs. 1998.*

(Continued)

*Primary Examiner*—Vivian Chin
*Assistant Examiner*—Devona E. Faulk
(74) *Attorney, Agent, or Firm*—Westerman, Hattori, Daniels & Adrian, LLP.

(57) ABSTRACT

In a multi-channel acoustic apparatus with a DVD reproduction function, comprising a DVD reproduction control unit for controlling the reproduction of a DVD, and a system control unit for controlling the overall acoustic apparatus and controlling the reproduction of another input source other than the DVD, the DVD reproduction control unit comprising the function of controlling a first Dolby Pro Logic decoder which can be used at the time of reproducing the DVD, and the system control unit comprising the function of controlling a second Dolby Pro Logic decoder which can be used at the time of reproducing the input source other than the DVD, there are provided means for adjusting a surround delay time period on the basis of a user operation, and means for transmitting to the system control unit the adjusted surround delay time period.

2 Claims, 10 Drawing Sheets

U.S. PATENT DOCUMENTS

| | | | | |
|---|---|---|---|---|
| RE35,954 E | * | 11/1998 | Levine | 380/242 |
| 5,917,781 A | * | 6/1999 | Kim | 369/4 |
| 5,933,398 A | * | 8/1999 | Fujinami | 369/47.16 |
| 6,160,953 A | * | 12/2000 | Fuchigami et al. | 386/105 |
| 6,297,797 B1 | * | 10/2001 | Takeuchi et al. | 345/467 |
| 6,310,842 B1 | * | 10/2001 | Higuchi | 369/47.15 |
| 6,473,561 B1 | * | 10/2002 | Heo | 386/125 |
| 6,694,027 B1 | * | 2/2004 | Schneider | 381/20 |
| 6,725,110 B2 | * | 4/2004 | Suzuki | 700/94 |
| 6,999,827 B1 | * | 2/2006 | Yong | 700/94 |

FOREIGN PATENT DOCUMENTS

JP  09-135130 A  5/1997

OTHER PUBLICATIONS

Japanese Notice of Rejection dated Mar. 15, 2006, issued in corresponding Japanese patent application No. 2002-084160.

Japanese Notice of Rejection dated Mar. 22, 2006, issued in corresponding Japanese patent application No. 2002-084158.

* cited by examiner

MULTI-CHANNEL ACOUSTIC APPARATUS WITH DVD REPRODUCTION FUNCTION

BACKGROUND OF THE INVENTION

1. Field of the Invention

The present invention relates to a multi-channel acoustic apparatus with a DVD reproduction function. "Dolby" and "Pro Logic" used in the specification are trademarks of Dolby Laboratories.

2. Description of the Prior Art

[1] In a multi-channel audio system, a surround delay adjustment and a level adjustment between speakers are performed in order to suitably reproduce a sound source. In the case of Dolby digital, a surround delay time period is adjusted such that a sound from a surround speaker and a sound from a front speaker simultaneously reach a listener. In Dolby Pro Logic in which separation between channels is not superior to that in the Dolby digital, a surround delay time period is adjusted such that a sound from a surround speaker reaches a listener immediately after a sound from a front speaker by a little longer (approximately 15 ms) delay.

In the same environment, there is thus a predetermined relationship in surround delay time period between the Dolby digital and the Dolby Pro Logic. If the surround delay time period is adjusted in one decode mode, therefore, the most suitable surround delay time period can be also set with respect to the other decode mode.

Developed as the multi-channel acoustic apparatus is one comprising a DVD reproduction control unit for controlling the reproduction of a DVD and a system control unit for controlling the overall apparatus and controlling the reproduction of another input source other than the DVD, and capable of changing the setting of a surround delay time period in each of both the control units.

In this type of multi-channel acoustic apparatus, when the surround delay time period in the Dolby digital or the Dolby Pro Logic is adjusted by the DVD reproduction control unit, the surround delay time period is controlled by the DVD reproduction control unit at the time of reproducing the DVD. Accordingly, the surround delay time period adjusted by the DVD reproduction control unit is reflected. In a case where the input source other than the DVD is reproduced and a case where the Dolby Pro Logic is decoded by the system control unit during the reproduction of the DVD, however, the surround delay time period adjusted by the DVD reproduction control unit is not reflected.

An object of the present invention is to provide a multi-channel acoustic apparatus with a DVD reproduction function, in which in a case where a surround delay time period is adjusted by a DVD reproduction control unit, the adjusted surround delay time period is automatically reflected in a Dolby Pro Logic decoder controlled by a system control unit.

[2] A multi-channel acoustic apparatus with a DVD reproduction function comprising a DVD reproduction unit and a built-in amplifier comprises the function of outputting a test tone (a noise) to each of channels and adjusting for each of the channels the output level of the channel such that a user can adjust an output level between speakers (channel balance adjustment). In a system capable of decoding a Dolby digital program source, a test tone is outputted to five channels, i.e., a left front channel, a center channel, a right front channel, a right surround channel, and a left surround channel at the time of adjusting an output level between the speakers, and the test tone is outputted from the corresponding speaker after being circulated for each of the channels.

Developed as the multi-channel acoustic apparatus with the DVD reproduction function is one comprising a DVD reproduction unit comprising a DVD reproduction control unit, and a system control unit for controlling the overall acoustic apparatus and controlling the reproduction of another input source other than a DVD.

In this type of multi-channel acoustic apparatus, when an attempt to perform channel balance adjustment processing only by the system control unit is made, a method of displaying a channel, whose output level is being adjusted, to which a test tone is outputted from a speaker and the output level of the channel is restricted on a display unit such as an FL (Fluorescent) or an LED (Light Emitting Diode) controlled by the system control unit, and a device capable of outputting a noise to each of channels, for example, a Dolby Pro Logic decode IC controlled by the system control unit is required in addition to a device for reproducing a DVD.

An object of the present invention is to provide a multi-channel acoustic apparatus with a DVD reproduction function capable of on-screen displaying a channel whose output level is being adjusted, information representing the channel, and the output level of the channel at the time of adjusting channel balance and making it easy to adjust the channel balance.

SUMMARY OF THE INVENTION

In a multi-channel acoustic apparatus with a DVD reproduction function, comprising a DVD reproduction control unit for controlling the reproduction of a DVD, and a system control unit for controlling the overall acoustic apparatus and controlling the reproduction of another input source other than the DVD, the DVD reproduction control unit comprising the function of controlling a first Dolby Pro Logic decoder which can be used at the time of reproducing the DVD, and the system control unit comprising the function of controlling a second Dolby Pro Logic decoder which can be used at the time of reproducing the input source other than the DVD, a first multi-channel acoustic apparatus with a DVD reproduction function according to the present invention is characterized in that the DVD reproduction control unit comprises means for adjusting a surround delay time period on the basis of a user operation; and means for transmitting to the system control unit the adjusted surround delay time period.

The system control unit comprises means for controlling a surround delay time period for the second Dolby Pro Logic decoder on the basis of the surround delay time period transmitted from the DVD reproduction control unit, for example.

In a multi-channel acoustic apparatus with a DVD reproduction function, a second multi-channel acoustic apparatus with a DVD reproduction function according to the present invention is characterized by comprising means for on-screen displaying on a monitor a channel to which a test tone is outputted from a speaker at the time of adjusting channel balance and the output level of the channel.

In a multi-channel acoustic apparatus with a DVD reproduction function, comprising a DVD reproduction unit comprising a DVD reproduction control unit, and a system control unit for controlling the overall acoustic apparatus and controlling the reproduction of another input source other than a DVD, the DVD reproduction unit outputting a test tone to each of channels at the time of adjusting channel balance, and the system control unit carrying out mute control of an audio for each of the channels so that the test tone is outputted from a corresponding speaker after being circulated for each of the channels, a third multi-channel acoustic apparatus with a DVD reproduction function according to the present invention is characterized in that the system control unit comprises means for changing, when a level change command to the channel, whose output level is being adjusted, to which the test tone is outputted from the speaker, is inputted by a user operation at the time of adjusting channel balance, the output level of the channel whose output level is being adjusted depending on the level change command, and means for transmitting to the DVD reproduction control unit information representing the channel whose output level is being adjusted and information representing the output level of the channel at proper times at the time of adjusting channel balance, and the DVD reproduction control unit comprises means for on-screen displaying, on the basis of the information representing the channel, whose output level is being adjusted, received from the system control unit and information representing the output level of the channel at the time of adjusting channel balance, the channel whose output level is being adjusted and the output level of the channel on a monitor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flow chart showing the procedure for surround delay time period reading processing performed by an AV decoder unit control microcomputer 10 in a case where the power to the AV decoder control microcomputer 10 is turned on;

FIG. 4 is a flow chart showing the procedure for surround delay time period setting processing performed by a system control microcomputer 1 when the power to the system control microcomputer 1 is turned on;

DESCRIPTION OF THE PREFERRED EMBODIMENTS

Figure 1:
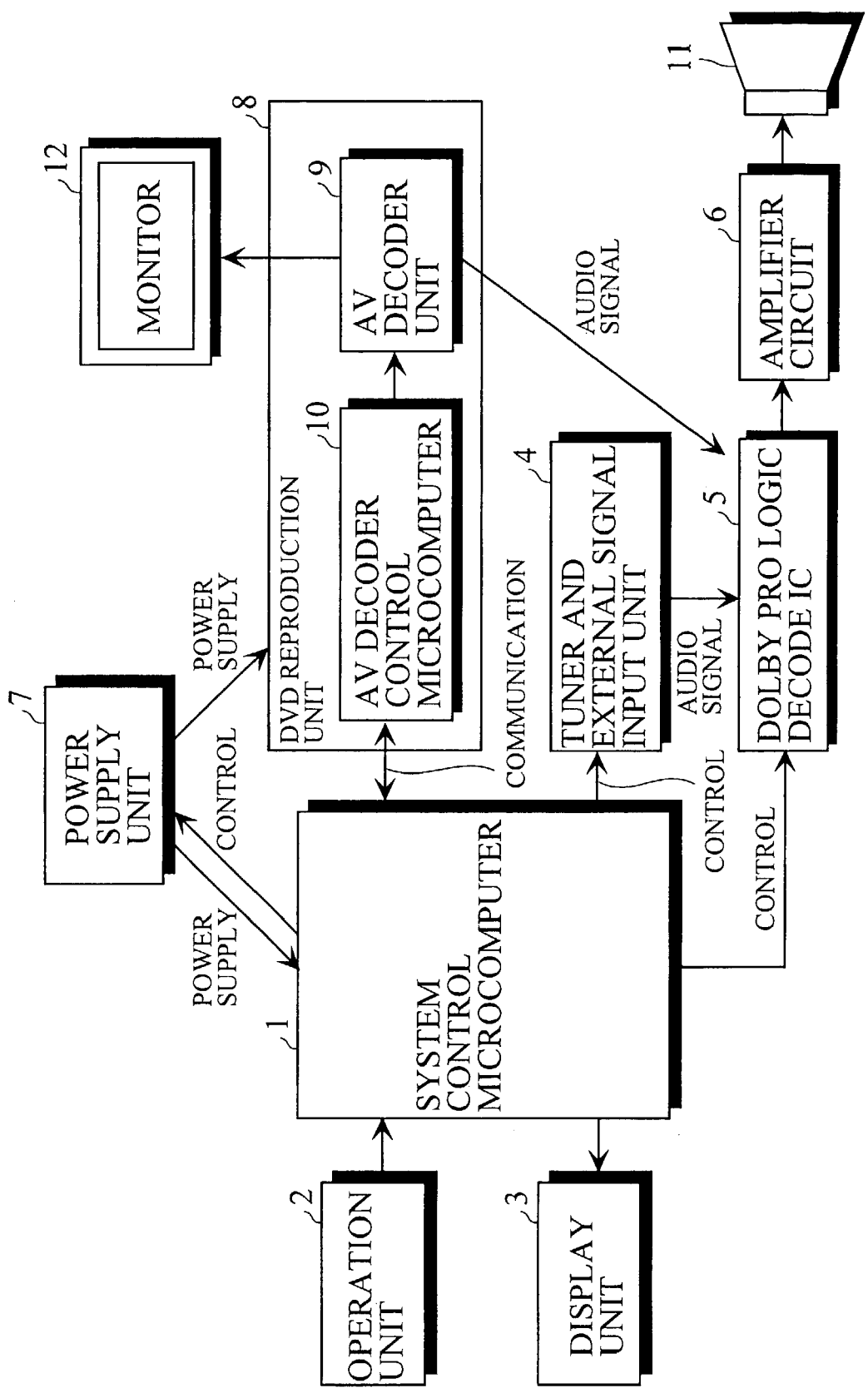
FIG. 1 is a block diagram showing the schematic configuration of a multi-channel acoustic apparatus with a DVD reproduction function.

Referring now to the drawings, embodiments of the present invention will be described.

[1] Description of First Embodiment

FIG. 1 illustrates the schematic configuration of a multi-channel acoustic apparatus with a DVD reproduction function.

An operation signal (key information) from an operation unit 2 is inputted to a system control microcomputer (a system control unit) 1. The system control microcomputer 1 controls a display unit 3 such as an FL or an LED, a tuner and external signal input unit 4, a Dolby Pro Logic decode IC (Dolby Pro Logic decoder) 5, an amplifier circuit 6, a power supply unit 7, and so on.

A DVD reproduction unit 8 reproduces a DVD, and comprises a drive unit (not shown), an AV decoder unit 9, and an AV decoder control microcomputer (a DVD reproduction control unit) 10. The AV decoder unit 9 decodes a signal read from the DVD by the drive unit, and comprises decoding means for decoding a video signal and decoding means for decoding an audio signal which correspond to an MPEG (Motion Picture Expert Group) system. The decoding means for decoding the audio signal comprises a Dolby digital decoder and a Dolby Pro Logic decoder in addition to an MPEG decoder.

The AV decoder control microcomputer 10 controls the AV decoder unit 9 and controls on-screen display, for example. Further, the AV decoder control microcomputer 10 comprises the function of transmitting and receiving display data and data representing a state, a surround delay time period, an operation command, etc. between the microcomputer 10 and the system control microcomputer 1.

Reference numeral 11 denotes a speaker, and reference numeral 12 denotes a monitor. Although only one speaker is illustrated in FIG. 1, the multi-channel acoustic apparatus actually comprises speakers corresponding to five channels (a left front, a center, a right front, a left surround, and a right surround).

When key information representing a DVD reproduction command is sent to the system control microcomputer 1 from the operation unit 2, the system control microcomputer 1 transmits the key information to the AV decoder control microcomputer 10. The AV decoder control microcomputer 10 controls the drive unit and the AV decoder unit 9 to start a DVD reproduction operation upon receipt of the key information. The AV decoder control microcomputer 10 transmits to the system control microcomputer 1 display data representing a reproduced state, time information, etc. The system control microcomputer 1 displays, when it receives the display data from the AV decoder control microcomputer 10, the received display data on the display unit 3.

A video signal decoded by the AV decoder unit 9 is fed to the monitor 12 and is displayed thereon. An audio signal decoded by the AV decoder unit 9 is fed to the speaker 11 after being amplified by the amplifier circuit 6 through the Dolby Pro Logic decode IC 5 and is outputted as an audio.

In a case where an input source other than the DVD is reproduced, the input source is decoded by the Dolby Pro Logic decode IC 5, is then amplified by the amplifier circuit 6, is fed to the speaker 11, and is outputted as an audio when a mode corresponding to the input source is a Dolby Pro Logic mode. When the mode is not a Dolby Pro Logic mode, the input source is fed to the amplifier circuit 6 through the Dolby Pro Logic decode IC 5 and is amplified thereby, is then fed to the speaker 11, and is outputted as an audio.

In the present embodiment, the surround delay time period is adjusted by a delay time period change command from the operation unit 2 when the AV decoder control microcomputer 10 is in a surround delay time period adjustment mode by the command from the operation unit 2. The surround delay time period set by adjusting the surround delay time period is stored in a nonvolatile memory in the AV decoder control microcomputer 10, is fed to the system control microcomputer 1 by communication, and is also stored in the nonvolatile memory in the system control microcomputer 1.

The surround delay time period is set by the system control microcomputer 1 for the Dolby Pro Logic decode IC 5 for subjecting the source other than the DVD to Dolby Pro Logic decoding.

FIGS. 2 to 5 show processing related to the setting of the surround delay time period.

Figure 2:
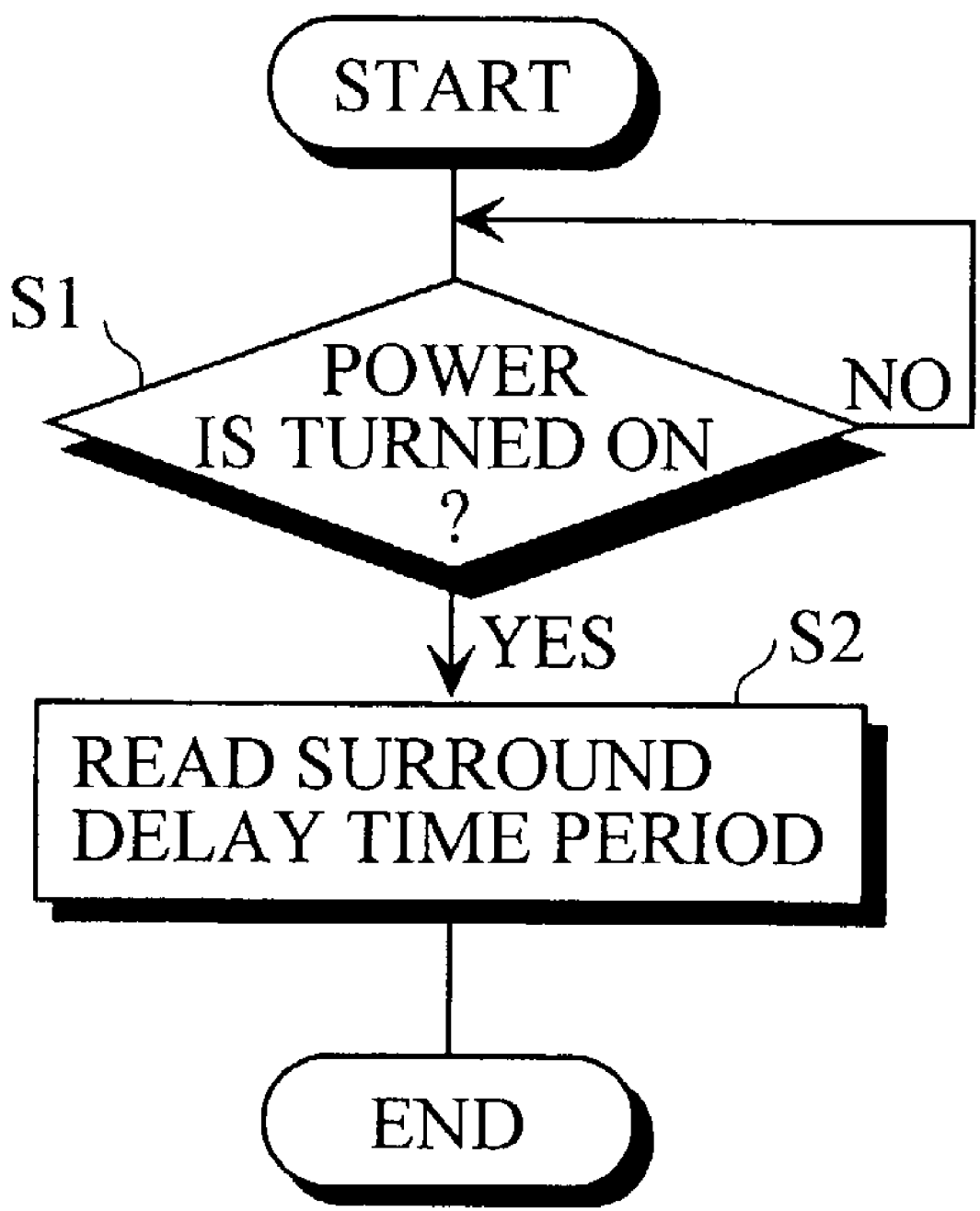

FIG. 2 shows the procedure for surround delay time period reading processing performed by the AV decoder control microcomputer 10 when the power to the AV decoder control microcomputer 10 is turned on.

When a DVD reproduction command is fed to the system control microcomputer 1 from the operation unit 2, the system control microcomputer 1 controls the power supply unit 7, to turn on the power to the DVD reproduction unit 8, and transmits the DVD reproduction command to the AV decoder control microcomputer 10.

The AV decoder control microcomputer 10 reads, when the power thereto is turned on (step S1), a surround delay time period currently set from the nonvolatile memory in the AV decoder control microcomputer 10 (step S2).

Figure 3:
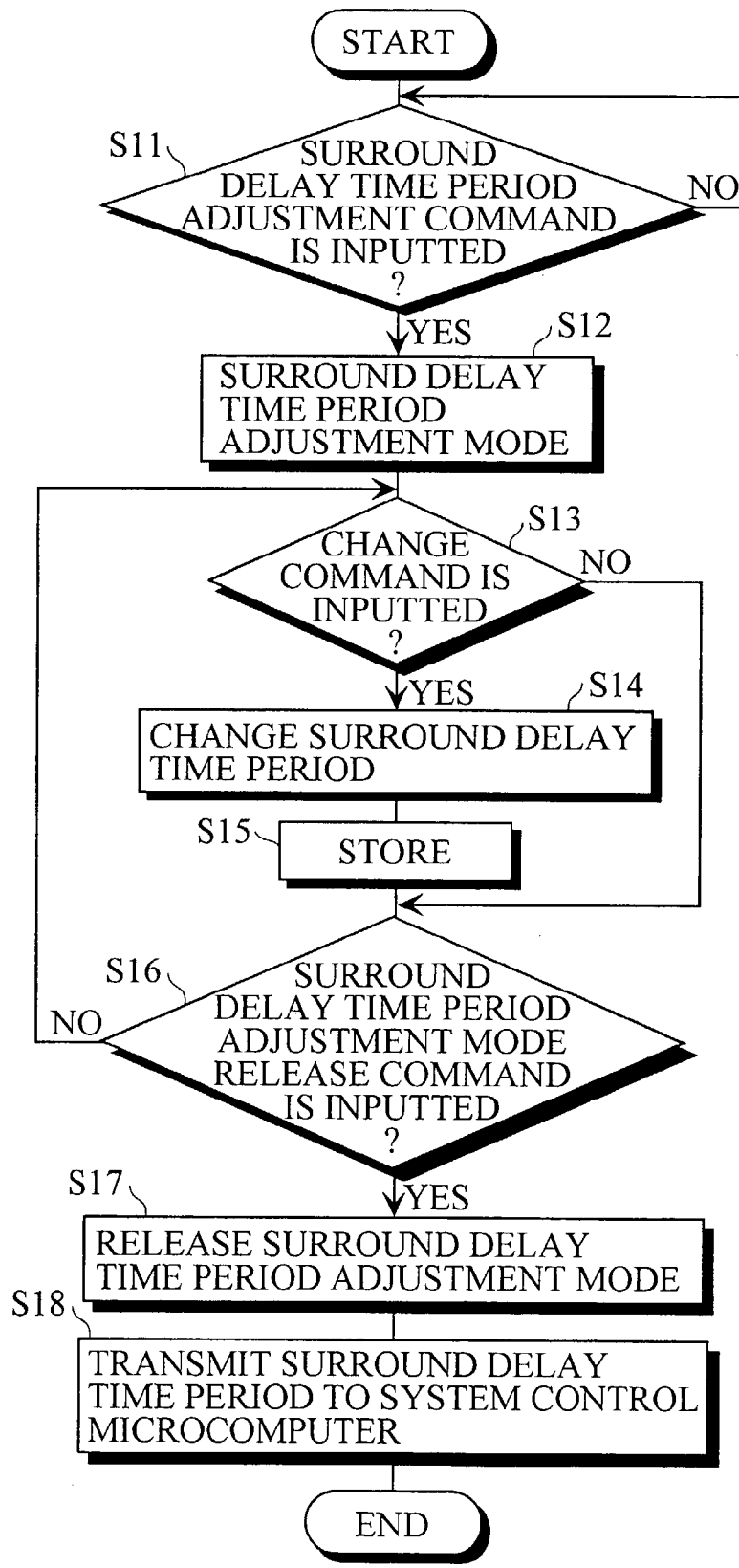
FIG. 3 is a flow chart showing the procedure for surround delay time period adjustment processing performed by an AV decoder control microcomputer 10.

FIG. 3 shows the procedure for surround delay time period adjustment processing performed by the AV decoder control microcomputer 10.

In a case where the mode is a DVD reproduction mode, when a surround delay time period adjustment command from the operation unit 2 is sent to the AV decoder control microcomputer 10 through the system control microcomputer 1 (step S11), the AV decoder control microcomputer 10 enters a surround delay time period adjustment mode (step S12).

In a state where the AV decoder control microcomputer 10 is in the surround delay time period adjustment mode, when the surround delay time period change command from the operation unit 2 is sent to the AV decoder control microcomputer 10 through the system control microcomputer 1 (step S13), the AV decoder control microcomputer 10 changes the surround delay time period currently set depending on the change command (step S14). The changed surround delay time period is stored in the nonvolatile memory in the AV decoder control microcomputer 10 (step S15).

In a state where the AV decoder control microcomputer 10 is in the surround delay time period adjustment mode, when a surround delay time period adjustment mode release command from the operation unit 2 is sent to the AV decoder control microcomputer 10 through the system control microcomputer 1 (step S16), the AV decoder control microcomputer 10 releases the surround delay time period adjustment mode (step S17), and transmits the surround delay time period currently set to the system control microcomputer 1 (step S18). The current surround delay time period adjustment processing is terminated.

Figure 4:
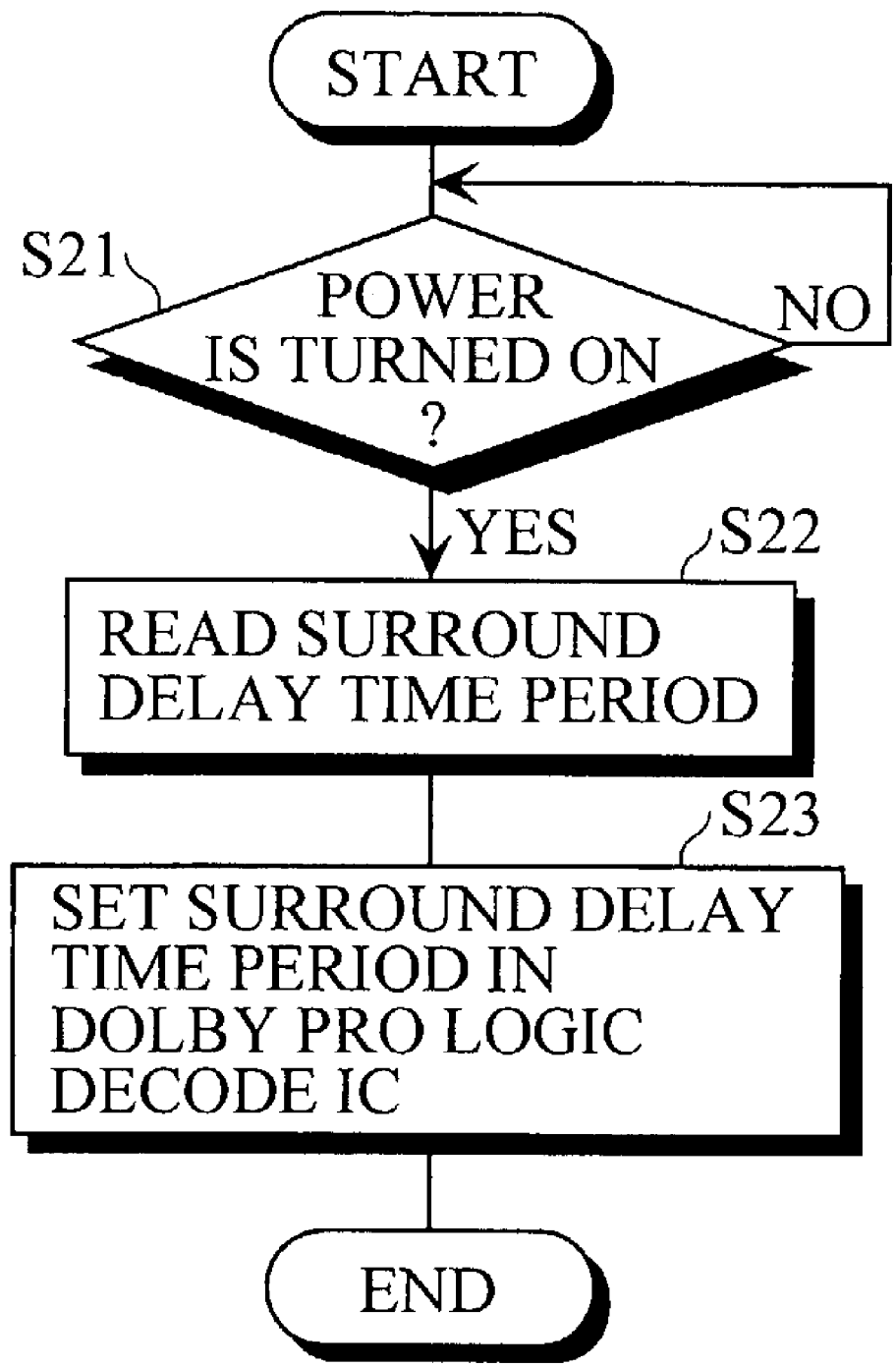

FIG. 4 shows the procedure for surround delay time period setting processing performed by the system control microcomputer 1 when the power to the system control microcomputer 1 is turned on.

The system control microcomputer 1 reads, when the power thereto is turned on (step S21), the surround delay time period currently set from the nonvolatile memory in the system control microcomputer 1 (step S22). The read surround delay time period is set in the Dolby Pro Logic decode IC 5 (step S23).

Figure 5:
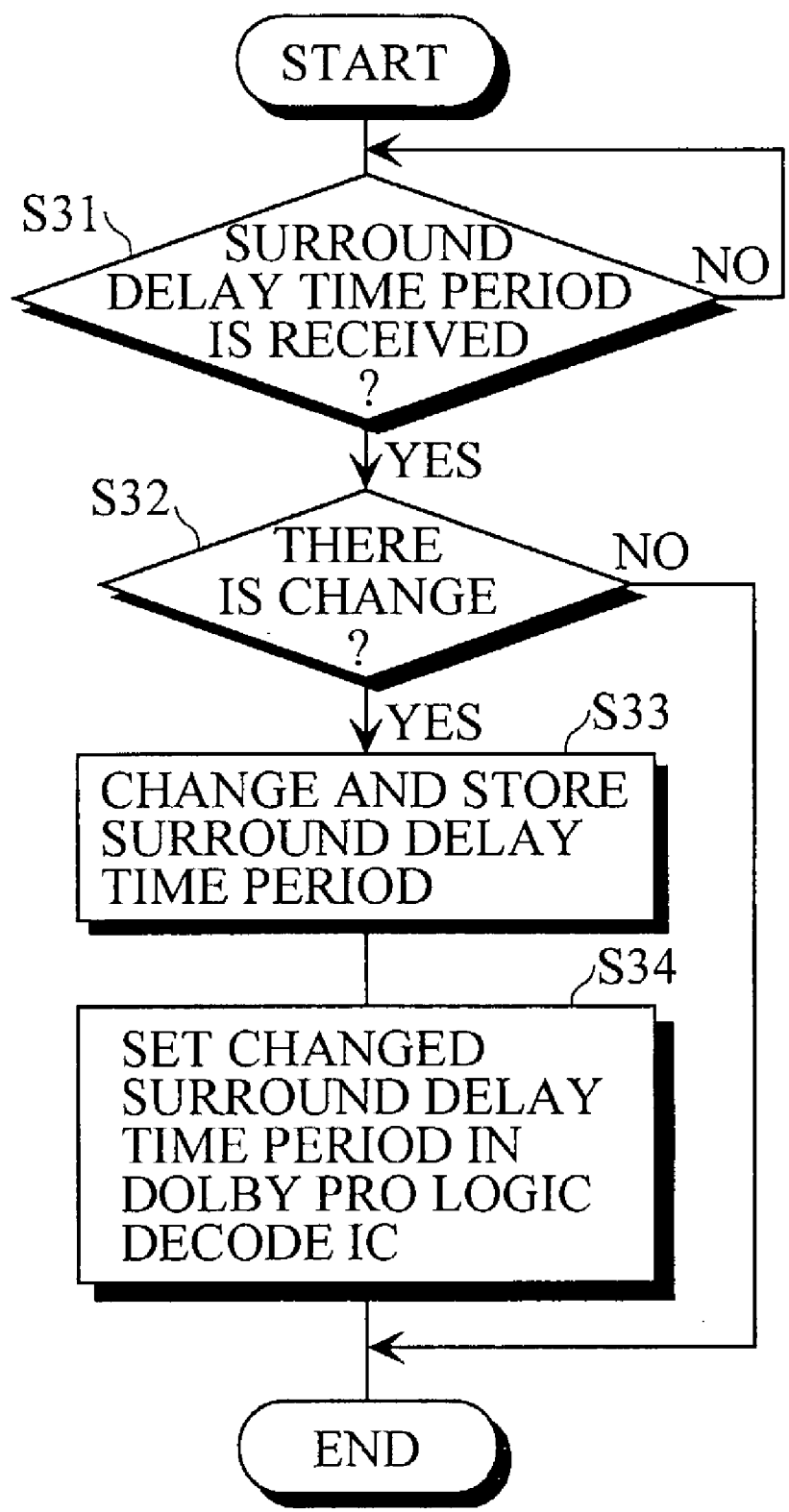
FIG. 5 is a flow chart showing the procedure for surround delay time period setting processing performed by a system control microcomputer 1 when a surround delay time period is transmitted to the system control microcomputer 1 from an AV decoder control microcomputer 10.

FIG. 5 shows the procedure for surround delay time period setting processing performed by the system control microcomputer 1 when the surround delay time period is transmitted to the system control microcomputer 1 from the AV decoder control microcomputer 10.

The system control microcomputer 1 judges, when it receives the surround delay time period from the AV decoder control microcomputer 10 (step S31), whether or not the received surround delay time period differs (is changed) from the surround delay time period currently held by the system control microcomputer 1 (step S32).

When there is no change, the surround delay time period is not changed. When there is a change, the surround delay time period is changed to the received surround delay time period, and is stored in the nonvolatile memory in the system control microcomputer 1 (step S33). Further, the changed surround delay time period is set in the Dolby Pro Logic decode IC 5 (step S34).

[2] Description of Second Embodiment

Figure 6:
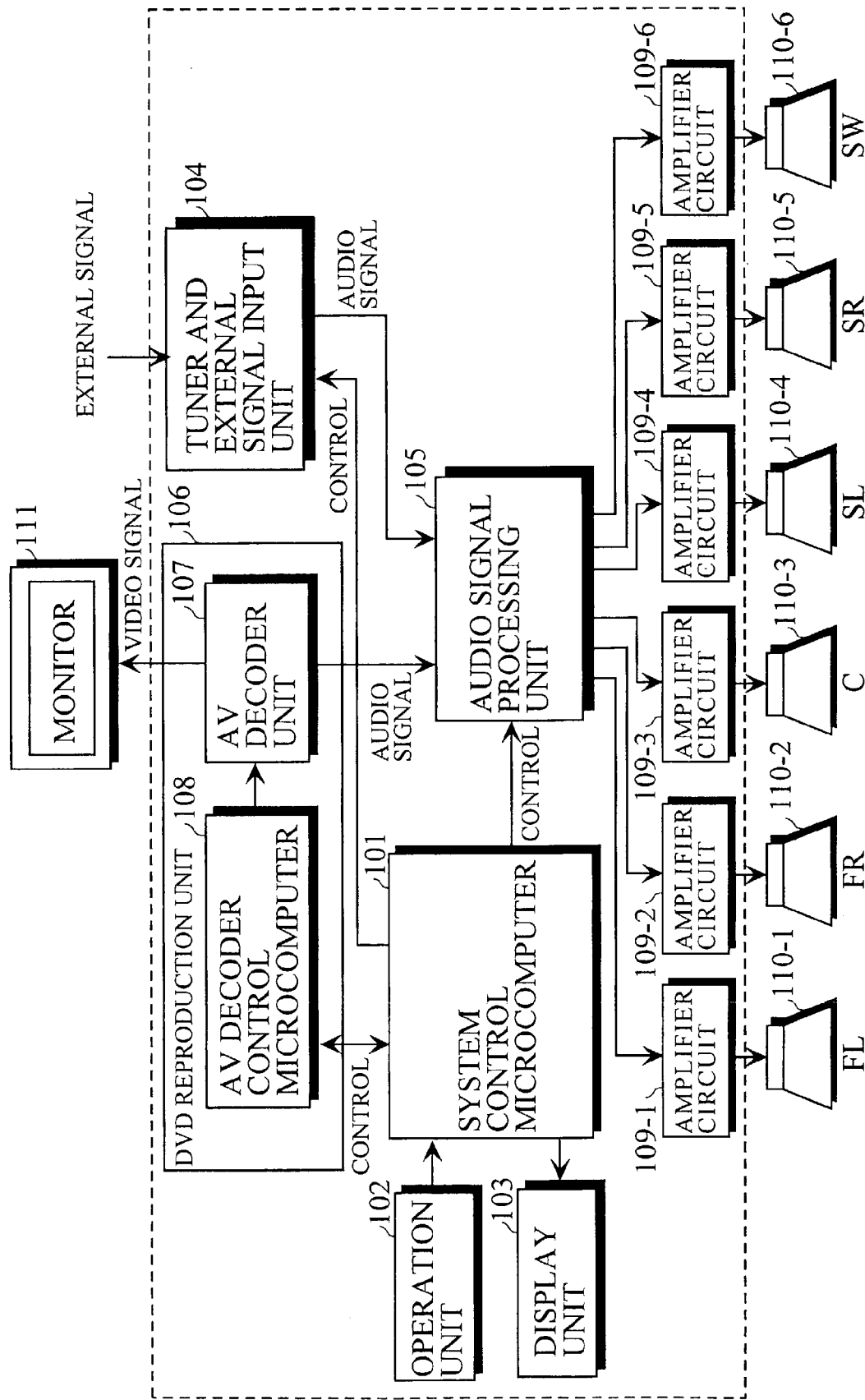
FIG. 6 is a block diagram showing the schematic configuration of a multi-channel acoustic apparatus with a DVD reproduction function.

FIG. 6 illustrates the schematic configuration of a multi-channel acoustic apparatus with a DVD reproduction function.

An operation signal (key information) from an operation unit 102 is inputted to a system control microcomputer (a system control unit) 101. The system control microcomputer 101 controls a display unit 103 such as an FL or an LED, a tuner and external signal input unit 104, an audio signal processing unit 105 comprising a surround IC, a volume IC, etc., and so on.

A DVD reproduction unit 106 reproduces a DVD, and comprises a drive unit (not shown), an AV decoder unit 107, and an AV decoder control microcomputer (a DVD reproduction control unit) 108. The AV decoder unit 107 decodes a signal read from the DVD by the drive unit, and comprises decoding means for decoding a video signal and decoding means for decoding an audio signal which correspond to an MPEG system. The decoding means for decoding the audio signal comprises a Dolby digital decoder and a Dolby Pro Logic decoder in addition to the MPEG decoder.

The AV decoder control microcomputer 108 controls the AV decoder unit 107 and controls on-screen display, for example. Further, the AV decoder control microcomputer 108 comprises the function of transmitting and receiving display data and data representing a state, an operation command, etc. between the microcomputer 108 and the system control microcomputer 101.

Reference numerals 109-1 to 109-6 denote amplifier circuits, and reference numerals 110-1 to 110-6 denote speakers. Reference numeral 111 denotes a monitor. The speaker 110-1 is a front left (FL) speaker, the speaker 110-2 is a front right (FR) speaker, the speaker 110-3 is a center (C) speaker, the speaker 110-4 is a surround left (SL) speaker, the speaker 110-5 is a surround right (SR) speaker, and the speaker 110-6 is a subwoofer (SW) speaker.

When key information representing a DVD reproduction command is sent to the system control microcomputer 101 from the operation unit 102, the system control microcomputer 101 transmits the key information to the AV decoder control microcomputer 108. The AV decoder control microcomputer 108 controls the drive unit and the AV decoder unit 107 to start a DVD reproduction operation upon receipt of the key information. The AV decoder control microcomputer 108 transmits to the system control microcomputer 101 display data representing a reproduced state, time information, etc. The system control microcomputer 101 displays, when it receives the display data from the AV decoder control microcomputer 108, the received display data on the display unit 103. Further, the system control microcomputer 101 controls the audio signal processing unit 105.

A video signal decoded by the AV decoder unit 107, together with an on-screen image, is fed to the monitor 111 and is displayed thereon. An audio signal decoded by the AV decoder unit 107 is fed to the speaker 110 through the audio signal processing unit 105 and the amplifier circuit 109 and is outputted as an audio.

In a case where an input source other than the DVD is reproduced, the input source is fed to the speaker 110 through the audio signal processing unit 105 and the amplifier circuit 109 and is outputted as an audio.

In the multi-channel acoustic apparatus, the DVD reproduction unit 106 outputs a test tone to each of channels at the time of adjusting channel balance, and the system control microcomputer 101 carries out mute control of an audio for each of the channels, thereby outputting the test tone from the corresponding speaker after circulating the test tone for each of the channels. An operation for outputting the test tone to each of the channels by the DVD reproduction unit 106 shall be referred to as a test tone operation.

Figure 7:
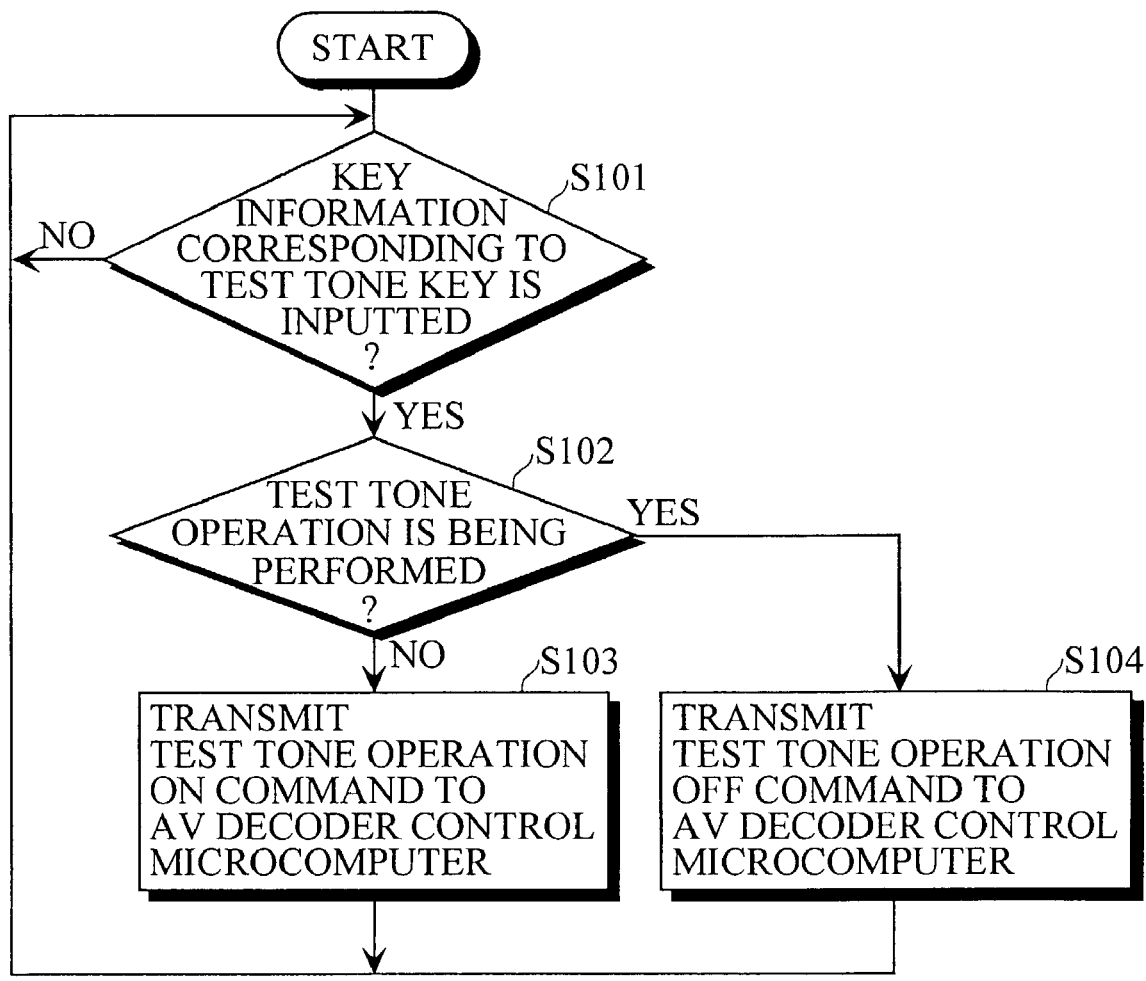
FIG. 7 is a flow chart showing the procedure for processing performed by a system control microcomputer 101 for causing a DVD reproduction unit 106 to start or terminate a test tone operation.
Figure 8:
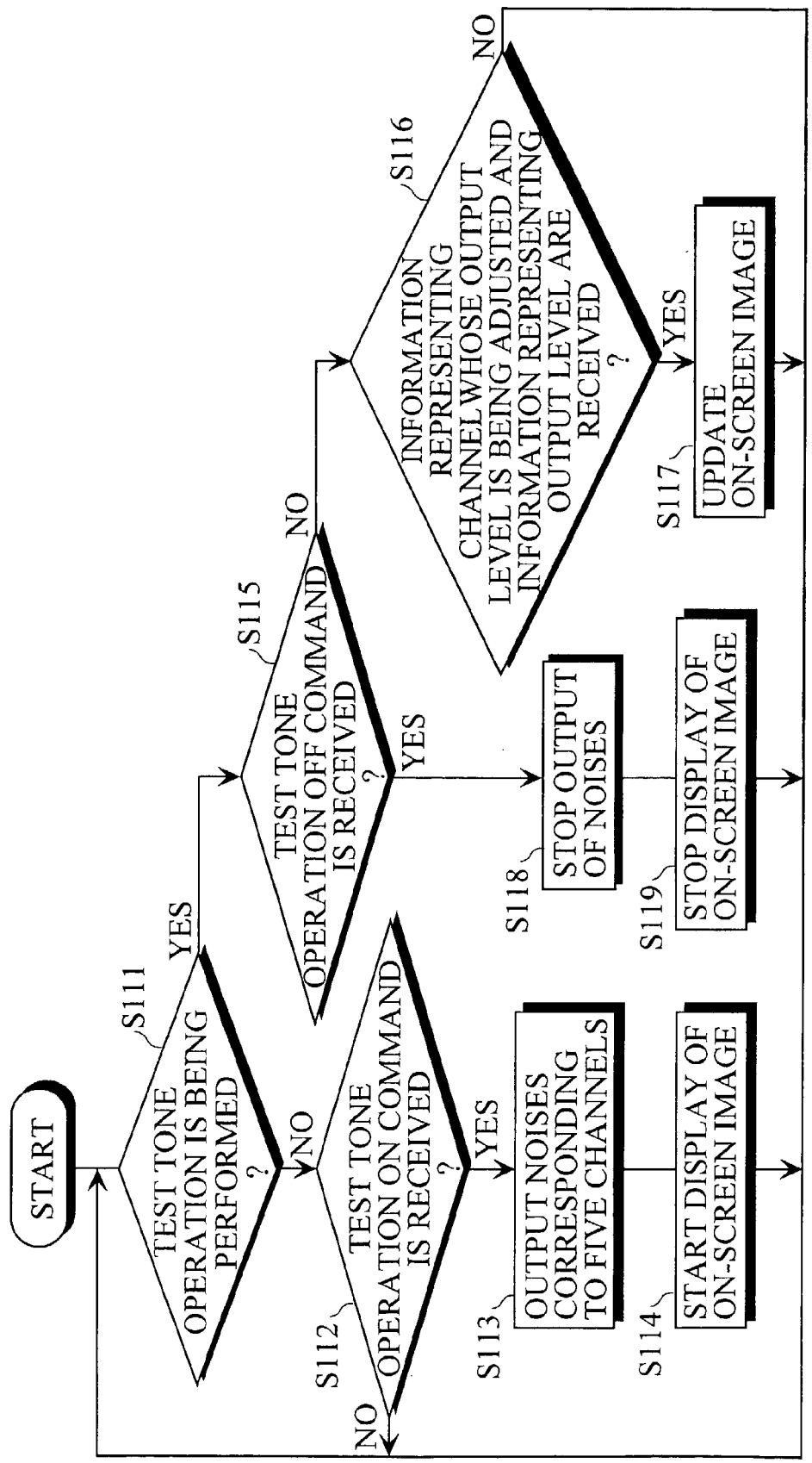
FIG. 8 is a flow chart showing the procedure for test tone output control processing performed by an AV decoder control microcomputer 108.
Figure 9:
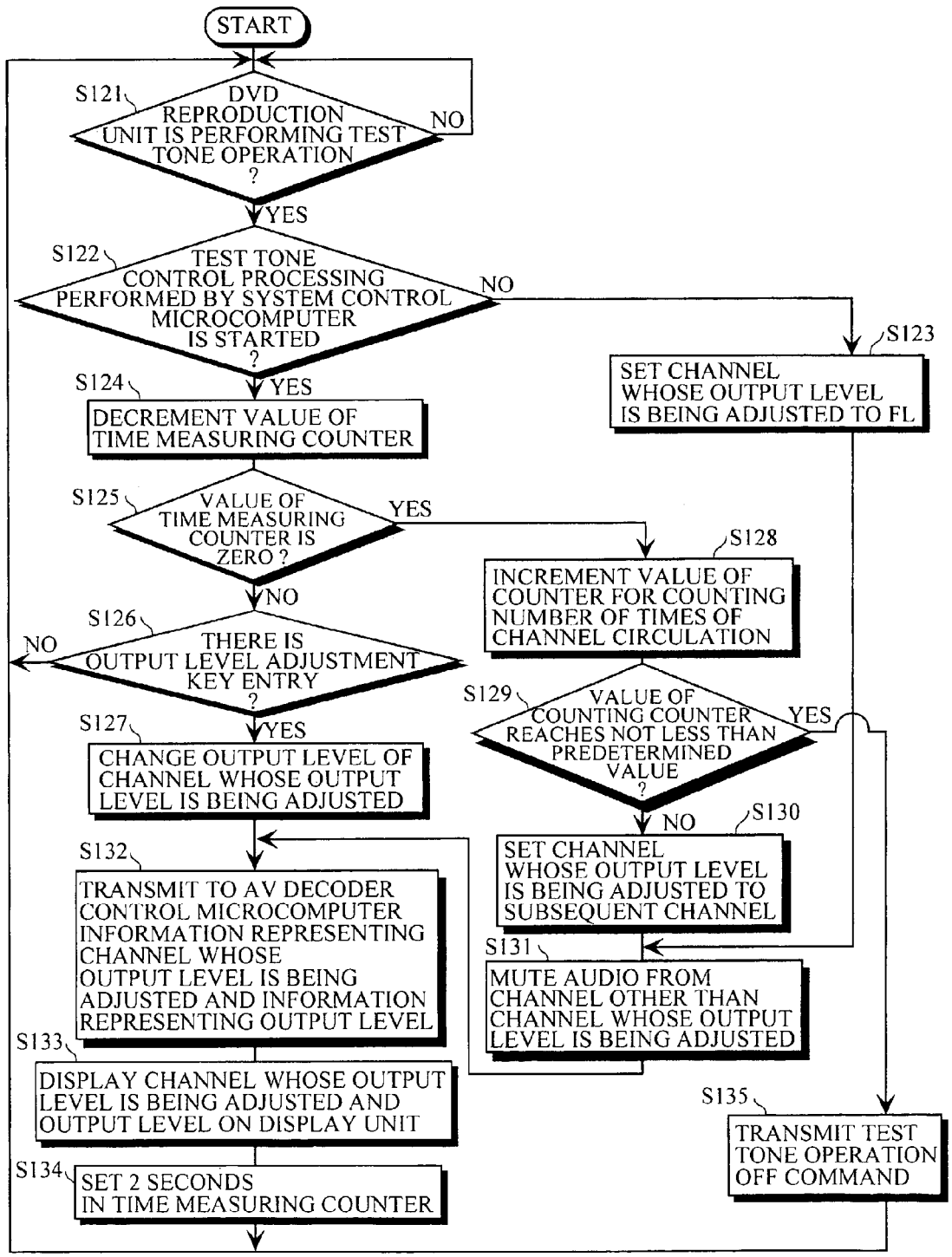
FIG. 9 is a flow chart showing the procedure for test tone control processing performed by a system control microcomputer 101 when a DVD reproduction unit 106 is performing a test tone operation.

FIGS. 7 to 9 show operations for adjusting channel balance.

FIG. 7 shows the procedure for processing performed by the system control microcomputer 101 for causing the DVD reproduction unit 106 to start or terminate a test tone operation.

The test tone operation performed by the DVD reproduction unit 106 is started by pressing a test tone key on the operation unit 102, and the test tone operation performed by the DVD reproduction unit 106 is terminated by pressing the test tone key during the test tone operation.

When key information corresponding to the test tone key is inputted to the system control microcomputer 101 (step S101), the system control microcomputer 101 judges whether or not the test tone operation is being performed (step S102).

Unless the test tone operation is being performed, the system control microcomputer 101 transmits a test tone operation ON command to the AV decoder control microcomputer 108 (step S103). If the test tone operation is being performed, the system control microcomputer 101 transmits a test tone operation OFF command to the AV decoder control microcomputer 108 (step S104).

FIG. 8 shows the procedure for test tone output control processing performed by the AV decoder control microcomputer 108.

In a case where the test tone operation is not being performed (NO in step S111), the AV decoder control microcomputer 108 controls, when it receives the test tone operation ON command from the system control microcomputer 101 (YES in step S112), the AV decoder unit 107, to output test tones (noises) corresponding to all five channels FL, C, FR, SL, and SR (step S113). Further, the AV decoder unit 107 is controlled, to display an on-screen image for adjusting channel balance on the monitor 111 (step S114). The program is then returned to the step S111.

During the test tone operation, the system control microcomputer 101 carries out mute control of an audio for each of the channels, to output the test tone from the corresponding speaker after circulating the test tone for each of the channels, as described later.

Figure 10:
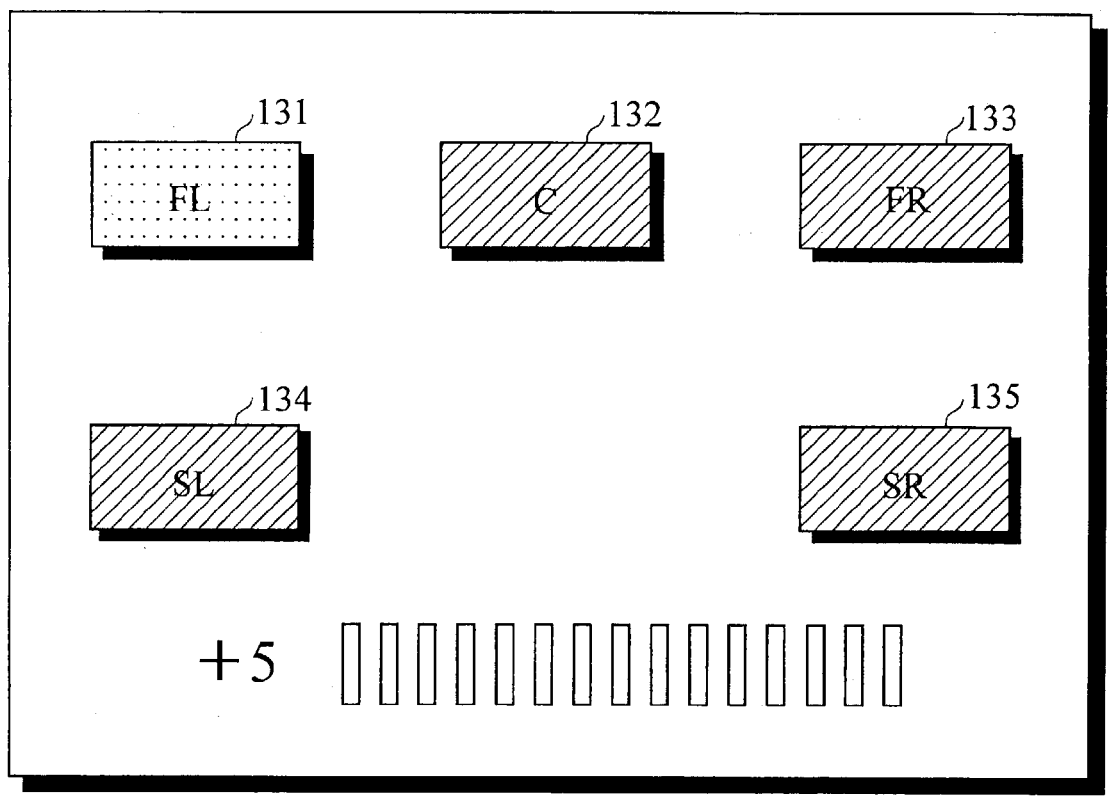
FIG. 10 is a schematic view showing an example of an on-screen image.

An example of the on-screen image is illustrated in FIG. 10. In this example, rectangular blocks 131 to 135 representing the speakers corresponding to the five channels FL, C, FR, SL, and SR are respectively displayed at positions corresponding to their arrangements, and the rectangular block representing the speaker corresponding to the channel to which the noise is being currently outputted is highlight-displayed. Further, the output level value of the channel to which the noise is being currently outputted, together with a numeral, is level-displayed.

In a case where the test tone operation is being performed (YES in step S111), the AV decoder control microcomputer 108 updates, when it receives from the system control microcomputer 101 information representing the channel to which the noise is outputted from the speaker (hereinafter referred to as the channel whose output level is being adjusted) and information representing the output level of the channel (No in step S115, and YES in step S116), the on-screen image depending on the received contents (step S117). The program is then returned to the step S111.

In a case where the test tone operation is being performed (YES in step S111), the AV decoder control microcomputer 108 controls, when it receives the test tone operation OFF command from the system control microcomputer 101 (YES in step S115), the AV decoder unit 107, to stop the output of the noises corresponding to all the five channels FL, CL, FR, SL, and SR (step S118). Further, the AV decoder unit 107 is controlled, to stop the display of the on-screen image for adjusting channel balance (step S119). The program is then returned to the step S111.

FIG. 9 shows the procedure for test tone control processing performed by the system control microcomputer 101 in a case where the DVD reproduction unit 106 is performing the test tone operation.

When the DVD reproduction unit 106 is performing the test tone operation (YES in step S121), the system control microcomputer 101 judges whether or not the test tone control processing performed by the system control microcomputer 101 is started (step S122). When the test tone control processing performed by the system control microcomputer 101 is not started, the system control microcomputer 101 first sets the channel whose output level is being adjusted to the channel FL (step S123). The system control microcomputer 101 controls the audio signal processing unit 105, to mute an audio from the channel other than the channel whose output level is being adjusted (step S131). Consequently, only the audio from the channel whose output level is being adjusted is outputted from the speaker 110 corresponding to the channel.

Thereafter, the system control microcomputer 101 transmits to the AV decoder control microcomputer 108 information representing the channel whose output level is being adjusted and information representing the output level of the channel (step S132). Further, the system control microcomputer 101 displays the channel whose output level is being adjusted and the output level of the channel on the display unit 103 (step S133). The system control microcomputer 101 sets a value corresponding to two seconds in a time measuring counter for output channel circulation (step S134), after which the program is returned to the step S121.

When it is judged in the foregoing step S122 that the test tone control processing performed by the system control microcomputer 101 is started, the system control microcomputer 101 decrements the value of the time measuring counter by one (step S124). The system control microcomputer 101 judges whether or not the value of the time measuring counter reaches zero (step S125).

When the value of the time measuring counter is one or more, the system control microcomputer 101 judges whether or not there is output level adjustment key entry from the operation unit 102 (step S126). If there is no output level adjustment key entry, the program is returned to the step S121. When there is output level adjustment key entry, the system control microcomputer 101 changes the output level of the channel whose output level is being adjusted (step S127), after which the program proceeds to the step S132.

When it is judged in the foregoing step S125 that the value of the time measuring counter reaches zero, the system control microcomputer 101 increments the value of a counting counter for counting the number of times of channel circulation by one (step S128). It is judged whether or not the value of the counting counter reaches not less than a predetermined value (step S129).

Unless the value of the counting counter reaches not less than the predetermined value, the channel whose output level is being adjusted is set to the subsequent channel (step S130), after which the program proceeds to the step S131.

As described in the foregoing, the channel whose output level is being adjusted is switched in a predetermined order and by circulation. Further, the output level of the channel whose output level is being adjusted is adjusted by an output level adjustment key operation from a user.

When the value of the counting counter reaches not less than the predetermined value (YES in step S129), the system control microcomputer 101 transmits a test tone operation OFF command to the AV decoder control microcomputer 108 in order to cause the DVD reproduction unit 106 to stop the test tone operation (step S135).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi-channel acoustic apparatus with a DVD reproduction function, comprising:
    a DVD reproduction control unit for controlling the reproduction of a DVD, the DVD reproduction control unit controlling a first Dolby Pro Logic decoder which is used at the time of reproducing the DVD;
    a system control unit for controlling the overall acoustic apparatus and controlling the reproduction of another input source other than the DVD, the system control unit controlling a second Dolby Pro Logic decoder which is used at the time of reproducing the input source other than the DVD,
    wherein the DVD reproduction control unit comprises
    means for adjusting a surround delay time period on the basis of a user operation; and
    means for transmitting to the system control unit the adjusted surround delay time period.
2. The multi-channel acoustic apparatus with the DVD reproduction function according to claim 1, wherein
    the system control unit comprises means for controlling a surround delay time period for the second Dolby Pro Logic decoder on the basis of the surround delay time period transmitted from the DVD reproduction control unit.

* * * * *